1,455,167

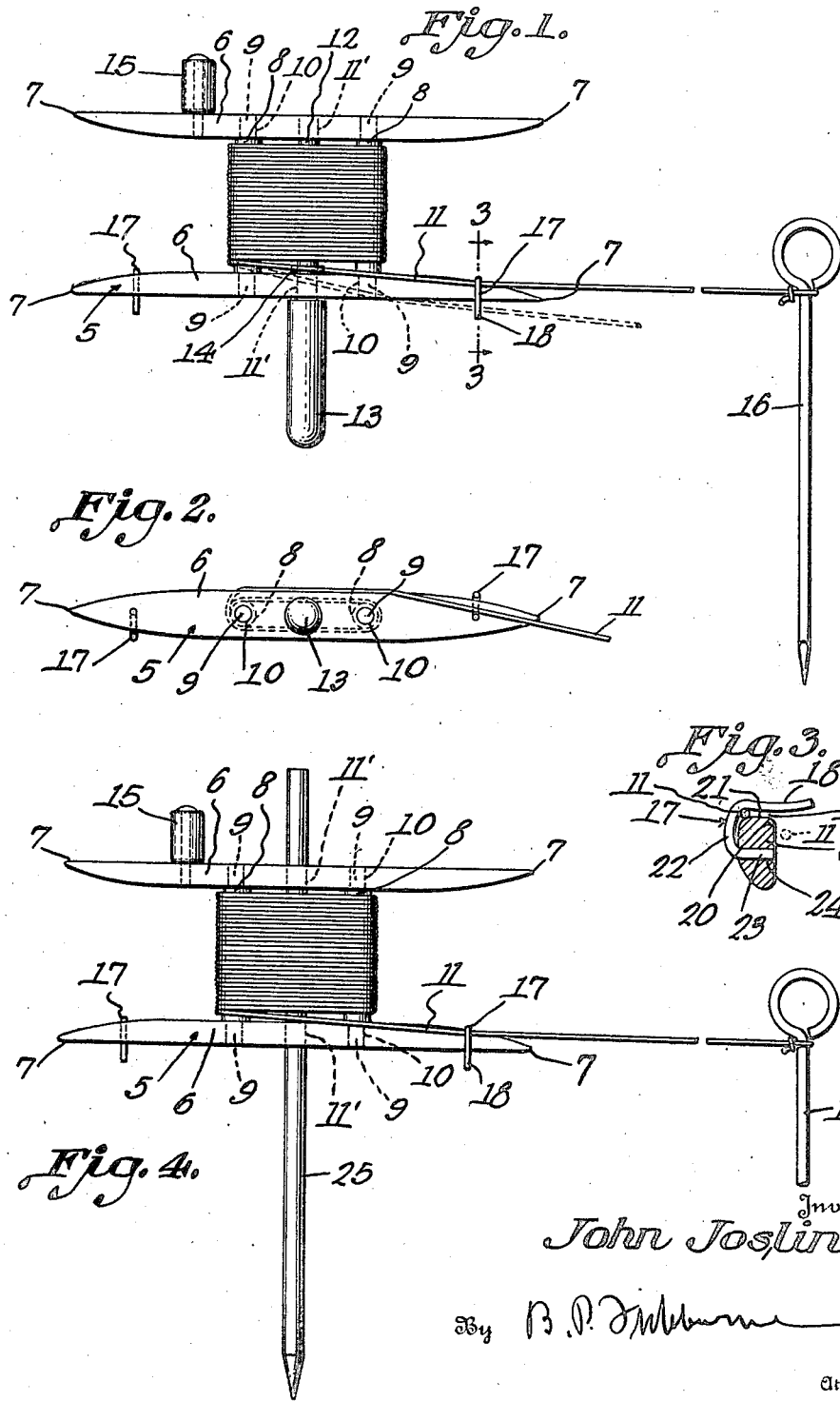
May 15, 1923.
J. JOSLIN
HAND REEL
Filed Dec. 8, 1922
1,455,167
Inventor
John Joslin
By B. P. —————
Attorney Patented May 15, 1923.

UNITED STATES PATENT OFFICE.

JOHN JOSLIN, OF PRINCEVILLE, ILLINOIS.

HAND REEL.

Application filed December 8, 1922. Serial No. 605,659.

*To all whom it may concern:*

Be it known that I, JOHN JOSLIN, a citizen of the United States, residing at Princeville, in the county of Peoria and State of Illinois, have invented certain new and useful Improvements in Hand Reels, of which the following is a specification.

My invention relates to improvements in hand reels.

An important object of the invention is to provide a device of the above mentioned character, which is of simple construction, strong, durable, and having novel means for locking the free end of the line against unwinding movement.

A further object of the invention is to so construct the line locking means, that the line may be quickly passed into the same, or automatically guided thereby to the holding position, when brought into contact with the locking means.

Other objects and advantages of the invention will be apparent during the course of the following description.

In the accompanying drawings, forming a part of this specification, and in which like numerals are employed to designate like parts throughout the same, Figure 1 is a side elevation of a reel embodying my invention, Figure 2 is an edge elevation of the same, Figure 3 is a transverse section taken on line 3—3 of Figure 1, and, Figure 4 is a side elevation of the reel, carrying a garden line.

Attention being called to Figures 1 to 4 inclusive, the numeral 5 designates a reel frame as a whole, embodying longitudinal side members 6, formed of any suitable material, and preferably having their ends pointed, as shown at 7. The side members 6 are rigidly connected by transverse members 8, having reduced ends 9, rigidly mounted within openings 10, formed in the side members. The numeral 11 designates a line, the starting end of which is secured to one of the transverse members 8. The line is wound upon the transverse members, as shown.

The side members 6 are provided between the transverse members 8 with openings 11, pivotally receiving a shaft or pin 12, having a handle 13, upon one end. A transverse stop pin 14 is removably mounted within a transverse opening within the shaft 12, and prevents displacement of the shaft. A handle or knob 15 is pivotally mounted upon the opposite side member 6, for turning the reel. In the winding operation, the handle 13 may be held in the left hand while the operator engages the handle 15 by the right hand, and bodily rotates the reel.

The free end of the line 8 is ordinarily connected with a pin or nail 16.

An important feature of my invention is the provision of a simple and reliable means to hold or lock the free end of the line against unwinding. This means embodies a resilient clamping element 17, which is approximately U-shaped. This clamping element has a forward or transverse arm 18, which extends across the transverse edge of the side member 6, and projects outwardly beyond the outer side face of the side member, for a substantial distance. This is an important point, as it enables the line to be quickly shifted to the locked or held position, without the necessity of guiding the same into the holding means. As clearly shown in Figures 1 and 3, the free end of the line is shifted in contact with the outer face of the side member 6, and is then moved upwardly to contact with the lower face of the arm 18, and is thereby automatically guided into the contracted space 19. The arm 18 has its outer portion slightly curved upwardly, and the wall of the side member 6 is slightly rounded, as shown at 20. The upper edge or wall 21 of the side member 6 may be slightly flattened in proximity to the arm 18, to provide a suitable contact surface. The inner portion 22 of the clamping element 17 is arranged in close relation to the inner wall of the member 6, and the extension 23 is rigidly held within a transverse opening 24.

In Figure 4 I have illustrated a slightly modified form of the invention. In this figure, the shaft 12 is dispensed with, and a longer pin 25 passed through the openings 11. This long pin is used when the device is employed as a garden line, and is designed to be inserted in the ground.

In the use of the reel, the pin 16 may be anchored in the mortar of a brick wall or the like being laid. The brick-layer may hold the handle 13 in the hand and walk away from the pin 16, the reel freely rotating for unwinding the line. After a desired length of the line is unwound, the line is brought into contact with the outer face of the side member 6, and then quickly moved upwardly in contact with the lower side of the arm 18, whereby the line will be automatically guided into the space 19, and have proper clamping engagement with the arm 18 and the wall 21. The line forwardly of the reel may now be wrapped around a second nail or pin embedded in the mortar. It would also be possible to insert the pointed ends 7 of the side members 6 in the mortar.

It is thought that no further explanation of the modified form of the device, shown in Figure 4, is necessary.

It is to be understood that the forms of my invention herewith shown and described are to be taken as preferred examples of the same, and that various changes in the shape, size, and arrangement of parts may be resorted to without departing from the spirit of my invention, or the scope of the subjoined claims.

Having thus described my invention, I claim:

1. A hand reel comprising a frame including a pair of spaced longitudinal side members, transverse members connecting the side members and having the line wound thereon, and a resilient clamping element secured to one side member near its end, said resilient clamping element including an arm extending transversely over the edge of the side member and projecting laterally beyond the outer side face of the same for a substantial distance, the outer end portion of the arm constituting a guide for the line brought in proximity to the outer face of the side member.

2. A hand reel comprising a frame including a pair of spaced longitudinal side members, transverse supporting means connecting the side members and having the line wound thereon, and a pair of resilient clamping elements mounted upon one of the side members, said clamping elements being approximately U-shaped and embodying arms which are arranged above and below their side member, each arm extending transversely of the side member and projecting laterally beyond the outer face of the same for a substantial distance, the outer end of the arm serving as a guide for the line brought in proximity to the outer face of the side member and shifted upwardly into engagement with such outer end.

In testimony whereof I affix my signature.

JOHN JOSLIN.